Figure 2:
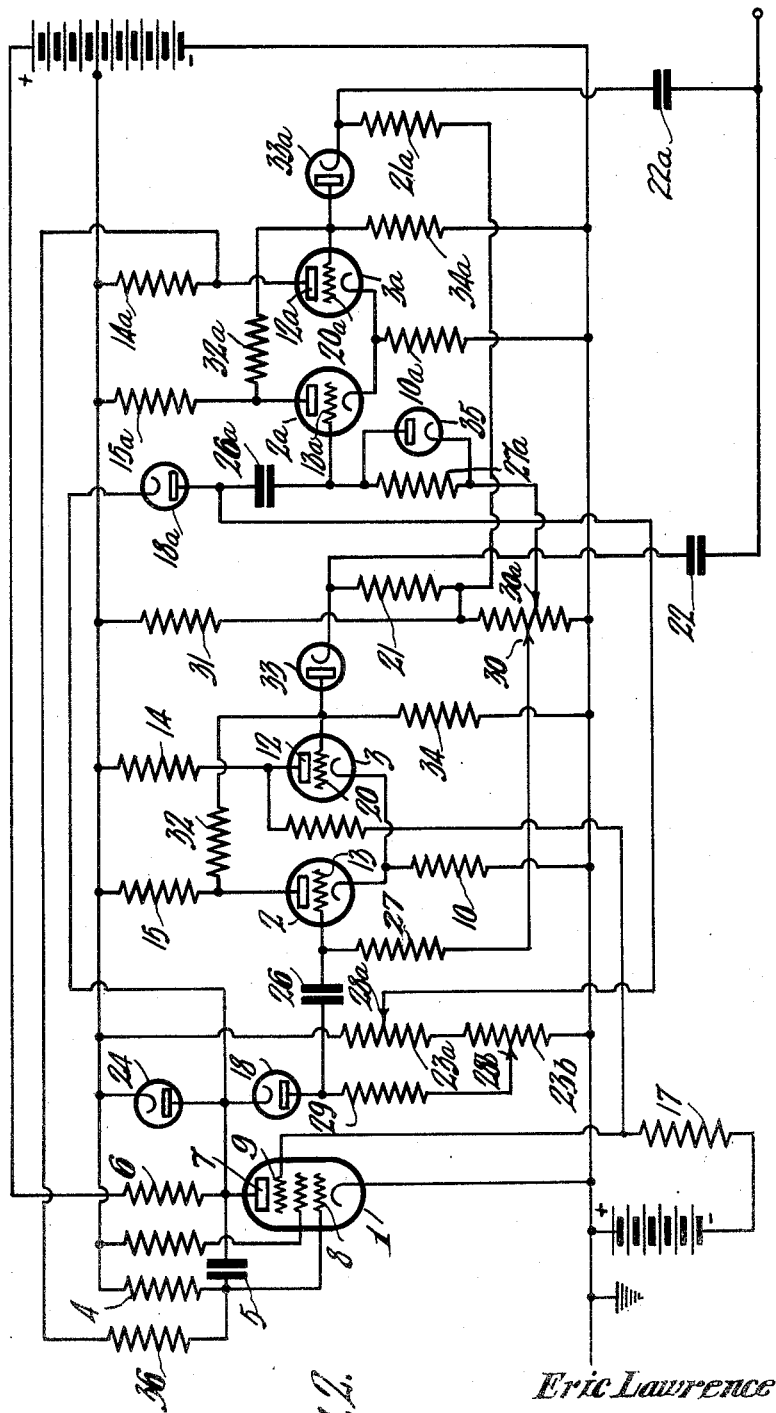

Oct. 24, 1950     E. L. C. WHITE     2,527,342
MULTIVIBRATOR AND INTEGRATING CIRCUIT COMBINATION
Filed April 26, 1946     2 Sheets-Sheet 1
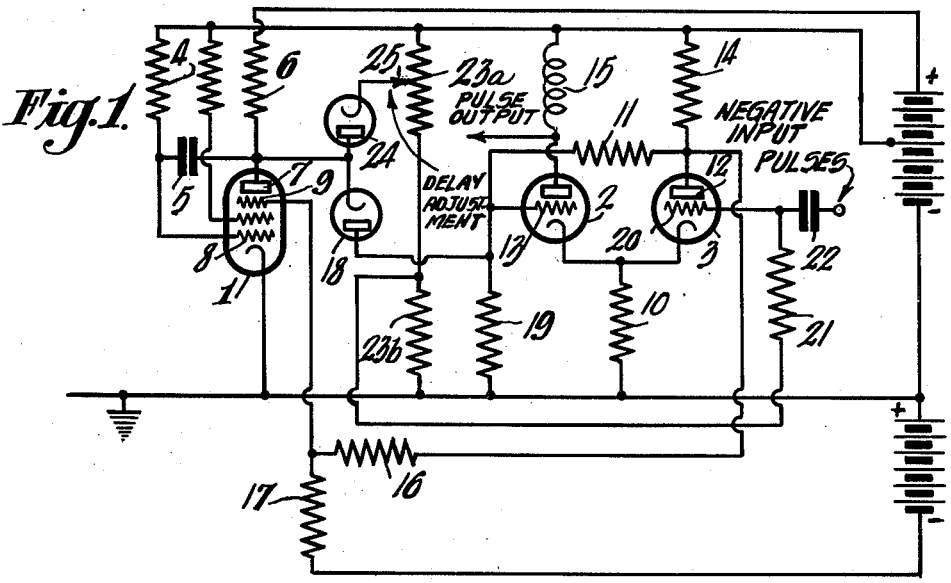
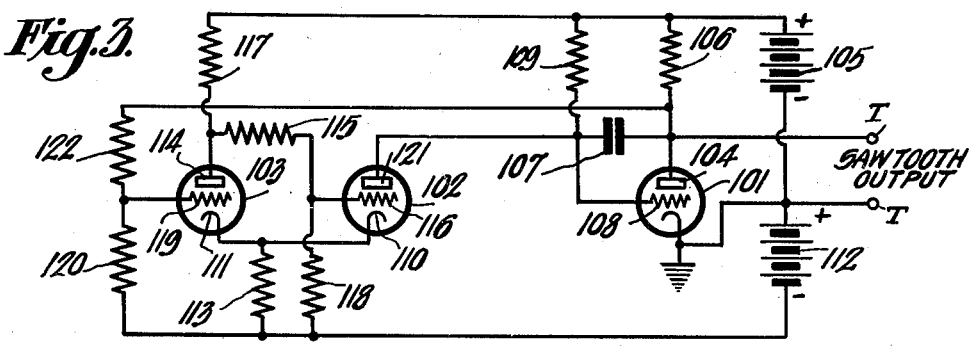
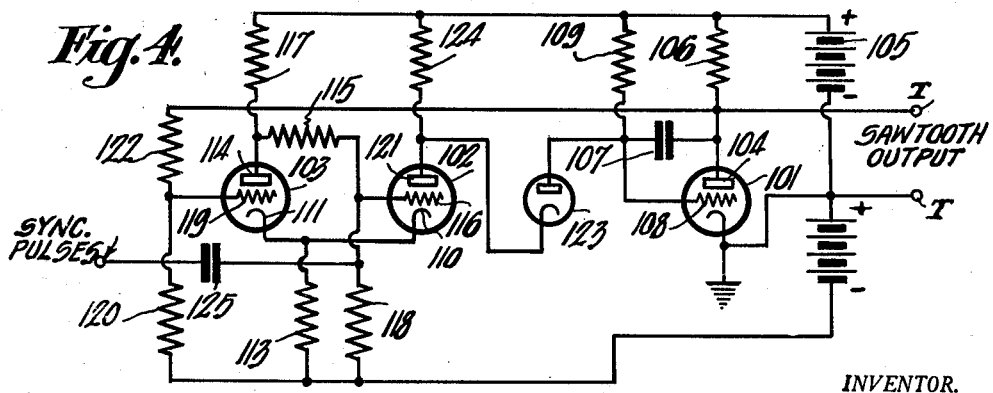
INVENTOR.
*Eric Lawrence Casling White*
BY
*H. G. Grover*
ATTORNEY Oct. 24, 1950         E. L. C. WHITE         2,527,342
MULTIVIBRATOR AND INTEGRATING CIRCUIT COMBINATION
Filed April 26, 1946                2 Sheets-Sheet 2

INVENTOR.
Eric Lawrence Casling White
BY H.G. Grover
ATTORNEY

Patented Oct. 24, 1950

2,527,342

UNITED STATES PATENT OFFICE 2,527,342

MULTIVIBRATOR AND INTEGRATING CIRCUIT COMBINATION

Eric Lawrence Casling White, Iver, England, assignor to Electric and Musical Industries, Limited, a British company Application April 26, 1946, Serial No. 665,030
In Great Britain December 18, 1943

Section 1, Public Law 690, August 8, 1946
Patent expires December 18, 1963

2 Claims. (Cl. 250—27)

This invention relates to electrical circuit arrangements and more particularly to circuit arrangements for generating electrical pulses having a predetermined time delay with respect to a series of master pulses or for generating electrical waveforms such as sawtooth waveforms.

According to the invention there is provided an electrical circuit arrangement comprising an integrating circuit and a multivibrator circuit having two conditions of equilibrium and coupling means so coupling said circuits that when the voltage or current developed in said integrating circuit reaches a predetermined value, said multivibrator circuit changes its condition of equilibrium and causes a modification of the integration of said integrating circuit.

If it is desired to generate pulses having a predetermined delay with respect to a master pulse, said coupling means may be such that said integration is interrupted by the change of equilibrium of said multivibrator circuit and said integrating circuit is restored to a predetermined condition and means may be provided for applying said master pulse to said multivibrator so as to change its condition of equilibrium to cause said integrating circuit to become operative and further means provided for developing said delayed pulse when said multivibrator again changes its condition of equilibrium under the control of said integrating circuit.

If, on the other hand, it is desired to generate oscillations having a sawtooth waveform, said coupling means may be such that said integration is reversed in sense by said change of the condition of equilibrium of said multivibrator circuit and means may be provided which when the voltage or current developed in said integrating circuit during said integration in reversed sense reaches a further predetermined value, causes said integration again to be reversed in sense whereby sawtooth voltage or current oscillations are developed in said integrating circuit.

If desired, said coupling means may be such that the rate of said integration is modified by said change of condition of said multivibrator circuit.

In order that the invention may be more clearly understood and readily carried into effect, examples of the application of the invention to the generation of the delayed pulses and to the generation of sawtooth oscillations will now be more fully described with reference to the accompanying drawings in which—

Figure 1 is a circuit diagram of one embodiment of the invention for producing electrical pulses, Figure 2 is a circuit diagram of another embodiment of the invention, and Figures 3 and 4 are circuit diagrams of two embodiments of the invention for producing sawtooth waves.

Figure 1 illustrates the invention as applied to a circuit for the generation of delayed pulses under the control of master pulses. The circuit shown comprises an integrating circuit including the valve 1 associated with a multivibrator circuit comprising valves 2 and 3. The integrating circuit is of the kind described in the specification of application Serial No. 592,641, filed May 8, 1945 and includes a charging resistance 4, a capacity 5 and the anode resistance 6 arranged in series with the capacity 5 connected between the anode 7 and control grid 8 of valve 1 so as to provide negative feedback. Valve 1 is provided with a second control grid 9 which can be biased so as to render valve 1 conducting or non-conducting. When valve 1 is in the non-conducting state its anode rapidly rises to a maximum voltage and remains at that voltage. If valve 1 is subsequently rendered conducting by the application of a positive voltage to the grid 9, the voltage on the anode 7 falls at a uniform rate determined by the values of resistance 4, capacity 5 and the voltage applied to the end of resistance 4 remote from the grid 8.

The multivibrator circuit is of a known type in which two valves 2, 3 share a common cathode resistance 10 and are further coupled by means of a resistance 11 connected between the anode 12 of one valve 3 and the control grid 13 of the other valve 2. A coupling resistance 14 is included in the anode circuit of valve 3 and an inductance coil or other impedance 15, from which an output may be taken, is included in the anode circuit of valve 2. Multivibrator circuits of this kind have two stable conditions of equilibrium and can be caused to pass from one condition to the other by the application of a suitable bias to the control grid of either valve.

It will be observed that the grid 9 is connected via resistance 16 to the anode 12 so that changes of the voltage of anode 12 are communicated to grid 9. Grid 9 is also biased to a suitable voltage by resistance 17, which is connected to a suitable source of negative bias. In addition, grid 13 is connected so as to follow negative variations of the voltage of anode 7 by means of a diode 18 and the leak resistance 19, diode 18 being arranged so as to remain non-conducting until its cathode, which is connected to the anode 7, falls to a predetermined low voltage, after which it becomes conducting and lowers the voltage of grid 13 as the voltage of anode 7 continues to fall. Grid 20 of valve 3 is biased via leak resistance 21 which is connected to the junction point of resistors 23a and 23b connected across the source of anode voltage. The master pulses are applied to the grid 20 via capacity 22. Diode 24 is provided to limit the maximum voltage to which anode 7 rises when valve 1 is rendered non-conducting to a value which can be adjusted as desired. For this purpose, the anode of diode 24 is connected to anode 7 and the cathode of diode 24 is connected to an adjustable tapping 25 on resistance 23a. Thus, when the voltage of anode 7 rises to the voltage of tapping 25, the diode 24 becomes conducting and prevents any further rise in the voltage of anode 7.

The arrangement operates as follows: Prior to the application of a master pulse, the bias conditions of valves 2 and 3 such that valve 3 is conducting and valve 2 is non-conducting. Thus, the voltage of anode 12 and consequently grid 9 are both low, so that valve 1 is held non-conducting and the voltage of anode 7 is equal to the voltage of taping 25. The master pulse is then applied to grid 20 via condenser 22 with negative polarity and causes valve 3 to pass over into the non-conducting state and the valve 2 to become conducting. The consequent rise of the voltage of anode 12 raises the voltage of grid 9 to an extent sufficient to render valve 1 conducting and to initiate the charging of condenser 5 and the steady fall of the voltage of anode 7. The circuit remains in this state with the voltage of anode 7 falling at a uniform rate until the diode 18 eventually becomes conducting and the voltage on grid 13 is thereupon lowered to an extent sufficient to cause valve 2 to pass over into the non-conducting state and thereby to cause valve 3 to become conducting again and consequently render valve 1 non-conducting. Thus, the integrating circuit is automatically reset in readiness for the next master pulse and the current change in impedance 15 when valve 2 passes from the conducting to the non-conducting state can be used to generate the pulse having the desired delay with respect to the applied master pulse. Impedance 15 may, if desired, comprise a time delay network so as to enable the delayed pulse to have any required duration in known manner.

It will be appreciated that the time delay of the delayed pulses with respect to the master pulses is determined by the time taken for the voltage of the anode 7 to fall from its starting voltage to the critical voltage of the grid 13 of the multivibrator. With the integrating circuit shown, due to the negative feedback provided, the voltage of grid 8 is held substantially constant while the voltage of the anode 7 falls, so that the charging current flowing into the capacity 5 will be substantially equal to $E_1/R_1$, where $E_1$ is the voltage applied to the upper end of resistance 4 and $R_1$ is the value of resistance 4. Thus, the rate at which the anode potential falls is given by $E_1/CR_1$, where $C$ is the value of capacity 5, and if $E_2$ is the potential from which the anode 7 commences to fall and $E_3$ is the potential of anode 7 at which the grid 13 of the multivibrator is triggered, the time delay will be $$T = \frac{CR_1}{E_1}(E_2 - E_3)$$

Thus, the time delay may be adjusted by choice of suitable values for any of the variables given in the above formula for T, the variable shown in the circuit of said Figure 1 being $E_2$, the potential of the slider 25.

If desired, instead of providing an adjustment for setting the value of $E_2$, $E_3$ may be made adjustable, in which case an A.-C. coupling is provided between the anode of diode 18 and grid 13 and said anode is connected via a resistance to a point of ajustable potential. As the potential of anode 7 descends, diode 18 remains non-conducting until its cathode, which is connected to anode 7, falls to a potential substantially equal to the potential impressed on the anode of diode 18 by said point of adjustable potential. Diode 18 then becomes conducting and the fall of the potential of anode 7 is thereafter communicated to grid 13 via the A.-C. coupling referred to which causes the multivibrator to be triggered, the D.-C. bias applied to grid 13 having been chosen to hold grid 13 close to the critical potential. In this case, the coupling between valves 2 and 3 is preferably arranged between the anode of valve 2 and grid 20 so as to avoid the application of back coupling voltages to grid 13.

In the case of the circuit arrangement of Figure 1 or variations thereof above referred to the master pulses may if desired be rectangular and be applied in the positive sense to capacity 22 in which case the values of capacity 22 and resistance 21 are chosen so as to differentiate said master pulses and thereby to develop sharp negative impulses on their trailing edges. To eliminate the positive pulses which occur on the leading edges of the master pulses a diode may be inserted between grid 20 and capacity 22 with a polarity such that it is non-conducting for positive pulses.

It may sometimes be required to provide more than one series of delayed pulses and this may conveniently be done by means of a plurality of multivibrators controlled by the same integrating circuit but having different critical potentials so that each multivibrator triggers at a different time after the integrating circuit is rendered operative. In such cases the integrating circuit is rendered operative and is reset by the multivibrator providing pulses having the greatest delay.

An example of a circuit of this kind will now be described with reference to Figure 2, in which elements performing the same as those shown in Figure 1 are given the same reference numerals and elements in a second multivibrator having similar functions to corresponding elements in the first multivibrator are given the same reference numerals with the suffix a.

It will be seen that the integrating circuit comprising the valve 1 and the first multivibrator comprising valves 2 and 3 are substantially the same as those shown in said Figure 1, the difference being that an A.-C. coupling comprising capacity 26 and resistance 27 is included between the anode of diode 18 and the grid 13 of valve 2, and instead of a variable bias being applied to the cathode of diode 24 it is applied from a tapping point 28 on a potentiometer 23 through resistance 29 to the anode of diode 18, the cathode of diode 24 being connected directly to the anode voltage supply line. The bias applied to grid 13 of valve 2 is obtained from the slider 30 on the potentiometer 31 connected across the anode voltage supply. In addition, the back coupling between valves 2 and 3 is obtained by means of a resistance 32 connected between the anode of valve 2 and grid 20, and a diode 33 is interposed between the grid 20 and capacity 22 so as to block positive pulses but to pass negative pulses which are developed when rectangular master pulses are used and are differentiated by capacity 22 and resistance 21. The valve 3 is also provided with grid leak resistance 34. These changes will be recognized as those above referred to in connection with a modification of the circuit arrangement of Figure 1.

A second multivibrator comprising valves 2a and 3a is connected similarly to that comprising valves 2 and 3 above referred to and is similarly controlled by the master pulses applied via capacity 22a, resistance 21a and diode 33a to grid 20a and is also controlled by anode 7 of valve 1 via diode 18a, capacity 26a and resistance 27a. Said multivibrator comprising valves 2a and 3a does not, however, control the voltage of control electrode 9 of valve 1 because the voltage applied to the anode of diode 18 from tapping point 28a on potentiometer 23a is such that said multivibrator is triggered before that comprising valves 2 and 3 as the voltage of anode 7 descends during the time when the integrating circuit is operative. As capacity 26a may become charged after the multivibrator comprising valves 2a and 3a has been triggered additional diode 35 is preferably connected across resistance 27a to discharge it before the arrival of the next master pulse. If it is desired that either of the multivibrators should be capable of giving a greater delay, then a diode corresponding to diode 35 should be connected across the grid resistance 27 and further means, including one or more diodes, should be arranged so that valve 1 is only rendered inoperative and reset when both multivibrators have been triggered.

If desired, the rate at which the potential of anode 7 falls when the integrating circuit is operative may be changed after the multivibrator developing the pulses of shorter delay has been triggered. Thus, referring to said Figure 2, a resistance 36 may be connected between the anode 12a and the junction of resistance 4 and capacity 5 so as to change the charging current flowing into capacity 5 when the potential of anode 12a falls following the triggering of multivibrators comprising valves 2a and 3a. In this way the rate at which the potential of anode 7 falls will initially be relatively great due to the fact that in addition to the charging current entering capacity 5 via resistance 4, additional charging current is fed into said capacity via resistance 36 from a point which is substantially at the anode supply voltage. After the multivibrator comprising valves 2a and 3a has been triggered, however, resistance 36 is connected to a point of much lower potential and therefore feeds a smaller current to capacity 5 and the rate at which the potential of anode 7 falls becomes much smaller. This may be a useful feature when the ratio of the time delays required is large, for example, of the order of 10:1 or 100:1 and when similar percentage accuracies in the delay of the pulses are desired.

Although in the arrangements above referred to, one of the multivibrators generating delayed pulses has been employed to render the integrating device inoperative and to reset it, it will be appreciated that an additional multivibrator may be ebployed solely for the latter purposes, if desired.

It will also be appreciated that any number of multivibrators may be used to develop delayed pulses providing that it is arranged that the integrating circuit is only rendered inoperative after the multivibrator giving the pulse having the greatest delay has been triggered.

Further, integrating circuits other than circuits of the kind above referred to of the kind described in the specification of application Serial No. 592,641, filed May 8, 1945 may be used, such as, for example, a conventional sawtooth generating circuit in which a condenser is charged exponentially through a resistance from a source of positive potential, and discharged by means of a discharging valve in shunt with the condenser. In this case the integrating circuit is rendered operative when said discharging valve ceases to conduct, for example, when a suitable negative bias is applied to a control electrode thereof.

The invention may also be applied to the generation of sawtooth waveforms. One such application of the invention will now be described with reference to Figure 3 of the drawings in which valve 101 is employed in the integrating circuit and valves 102 and 103 are employed in the multivibrator circuit. Anode 104 of valve 101 is connected to the positive pole of a source of anode voltage 105 through resistance 106 and is also coupled by a feedback capacity 107 to its grid 108, which is connected via charging resistance 109 to the positive pole of the source 105 which also provides charging current. This arrangement constitutes an integrating circuit as described in the specification of copending application Serial No. 592,641, filed May 8, 1945 in which as capacity 107 charges, the negative feedback which takes place via capacity 107, causes the voltage of anode 104 to change at a constant rate.

Valves 102 and 103 are connected in a known type of multivibrator circuit. Their respective cathodes 110 and 111 are connected together and to the negative pole of a source of voltage 112 via a coupling resistance 113, while the anode 114 of valve 103 is connected via resistance 115 to the grid 116 of valve 102 and is also connected via anode resistance 117 to the positive pole of the source of current 105. Grid 116 is also connected to the negative pole of source 112 via resistance 118, and grid 119 of valve 103 is also connected to said negative pole via resistance 120. Anode 121 of valve 102 is connected via resistance 109 to the positive pole of source 105. As is known, this arrangement has two conditions of equilibrium in which either valve 102 or valve 103 is conducting and it can be caused from one condition of equilibrium to another by the change of the bias applied to the grid of either valve. In the present case this control bias is applied to grid 119 via resistance 122 connected to anode 104, so that as the voltage on anode 104 falls, a point is eventually reached at which grid 119 becomes sufficiently negative to cause valve 103 to become non-conducting, whereupon said multivibrator circuit changes its condition of equilibrium and valve 102 which was formerly non-conducting becomes conducting. Anode 121 of valve 102 is connected to grid 108 so that when valve 102 becomes conducting it provides a path via resistance 113 to the negative pole of source 112 through which said capacity 107 may be charged in the opposite sense to that in which it is charged by resistance 109. By suitable choice of the values of resistance 109 and 113 and the voltage of sources of 105 and 112, it can be arranged that when valve 102 is conducting, capacity 107 receives a steady increasing negative charge so that the voltage of anode 104 will rise at a steady rate. Thus, a point will be reached at which the bias of grid 119 will again become sufficiently positive to cause valve 103 to conduct, whereupon the multivibrator will again change its condition of equilibrium and valve 102 will become non-conducting so that the integrating circuit will again operate as above referred to and the voltage of anode 104 will decrease at a steady rate. It will therefore be seen that a voltage of sawtooth waveform will be developed across output terminals T connected to anode 104 and cathode of valve 101.

Figure 4 of the drawings shows a further application of the invention to the generation of sawtooth waveforms. The circuit shown in this figure differs from the circuit of Figure 3 only in that a unidirectionally conducting device 123 has been interposed between anode 121 and grid 108 and that valve 102 has been provided with a separate anode resistance 124. This modification has the advantage that any leakage current which may be passed by valve 102 when in the non-conducting state no longer passes through the charging resistance 109 due to the fact that the device 123 is so connected that in these circumstances it is non-conducting. Thus, the device 123 is conveniently a diode with its cathode connected to anode 122 which is in the circumstances referred to positive in relation to grid 108 to which the anode of diode 123 is connected. It will be appreciated that in cases in which charging resistance 109 has a high value in order to secure a relatively slow rate of decrease on the voltage of anode 104, any leakage current flowing through said resistance 109 could seriously modify the slope of the falling portion of the waveform at anode 104.

It will be seen that the arrangements shown in Figures 3 and 4 serve to generate sawtooth waveforms and the slopes of the rising and falling portions of these waveforms can be controlled by the choice of values of different components in the circuits and the voltages of the sources of voltage employed. If desired, the generated sawtooth can be synchronized by means of impulses applied from some external source provided that the circuit is adjusted so that these impulses arrive shortly before the multi-vibrator portions would normally effect its transition so that the transition is caused to occur by the incoming impulses. Such control impulses may be conveniently applied through a capacity 125 to grid 116, or if multi-grid valves are used instead of triode valves shown in the figures, these trigger pulses may be applied to other control electrodes, such as suppressor electrodes of such valves.

I claim as my invention:

1. An electrical circuit arrangement for generating pulses having a predetermined delay with respect to a master pulse comprising an integrating circuit and a multivibrator circuit having two conditions of equilibrium and means for so coupling said circuits that in response to the voltage or current developed in said integrating circuit reaching a predetermined value, said multivibrator circuit changes its condition of equilibrium and causes an interruption of the integration of said integrating circuit and causes said integrating circuit to be restored to a predetermined condition, said arrangement having means for applying said master pulse to said multivibrator circuit so as to change its condition of equilibrium to cause said integrating circuit to become operative and a further multivibrator circuit having two conditions of equilibrium so coupled to said integrating circuit that when the voltage or current developed in said integrating circuit reaches another predetermined value, said further multivibrator circuit changes its condition of equilibrium and generates said delayed pulse.

2. The invention according to claim 1 wherein there is provided means comprising a resistor coupling said further multivibrator circuit and said integrating circuit for modifying the rate of said integration as a function of said change of the condition of said further multivibrator circuit.

ERIC LAWRENCE CASLING WHITE.

REFERENCES CITED

The following references are of record in the file of this patent:

UNITED STATES PATENTS

| Number | Name | Date |
| --- | --- | --- |
| 2,265,290 | Knick | Dec. 9, 1941 |
| 2,412,485 | Whiteley | Dec. 10, 1946 |
| 2,414,486 | Rieke | Jan. 21, 1947 |